Figure 1:
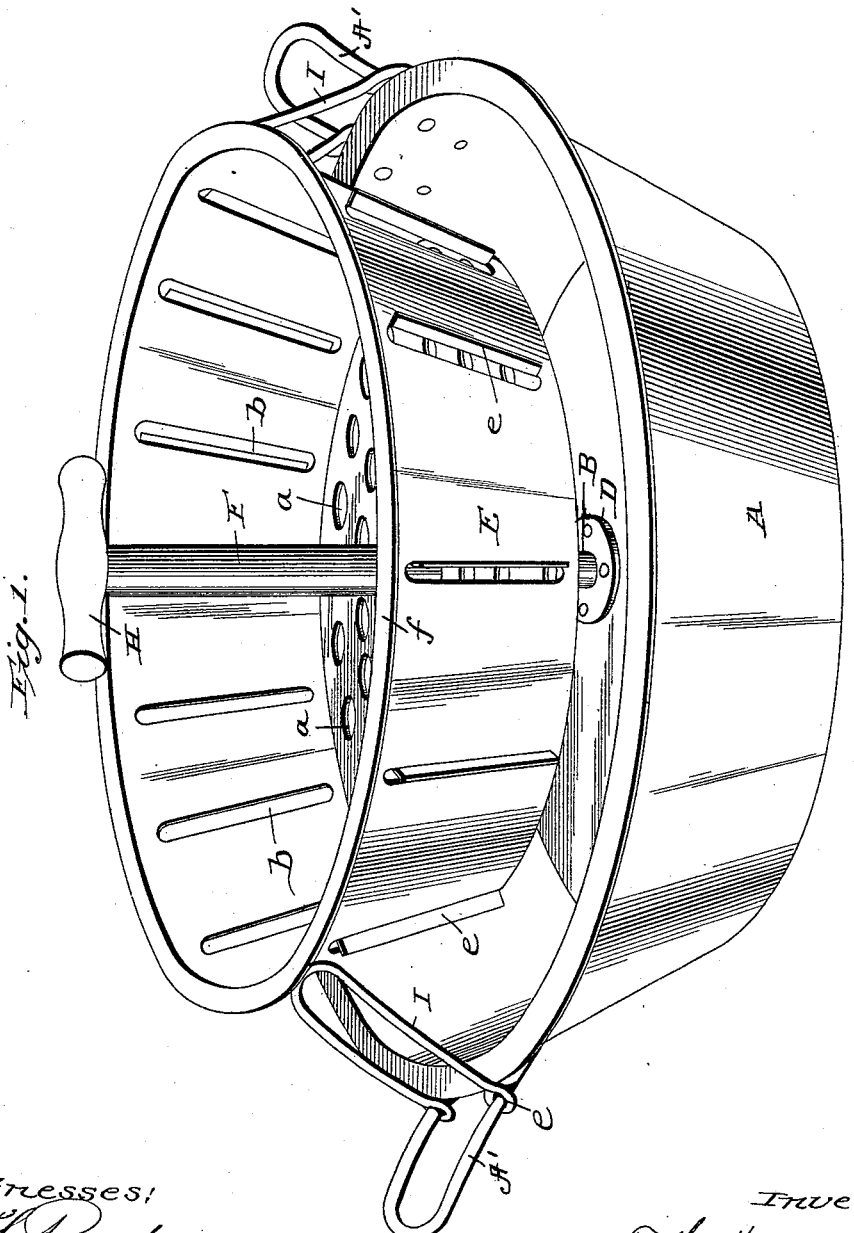

(No Model.) 2 Sheets—Sheet 1.

F. H. WEST.
DISH CLEANER.

No. 518,298. Patented Apr. 17, 1894.

Witnesses:
C. H. Raeder
N. F. Matthews.

Inventor
F. H. West
By James J. Sheehy
Attorney

THE NATIONAL LITHOGRAPHING COMPANY,
WASHINGTON, D. C.

(No Model.)  
F. H. WEST.  
DISH CLEANER.

2 Sheets—Sheet 2.

No. 518,298. Patented Apr. 17, 1894.

Fig. 2

Fig. 3.

Witnesses:  
C. H. Raeder  
N. F. Matthews

Inventor  
F. H. West  
By James J. Sheehy  
Attorney

THE NATIONAL LITHOGRAPHING COMPANY,  
WASHINGTON, D. C.

UNITED STATES PATENT OFFICE.

FRANCIS HENRY WEST, OF PORTLAND, OREGON.

DISH-CLEANER.

SPECIFICATION forming part of Letters Patent No. 518,298, dated April 17, 1894.

Application filed July 21, 1893. Serial No. 481,136. (No model.)

*To all whom it may concern:*

Be it known that I, FRANCIS HENRY WEST, a citizen of the United States, residing at Portland, in the county of Multnomah and State of Oregon, have invented certain new and useful Improvements in Dish Washing and Draining Apparatus; and I do declare the following to be a full, clear, and exact description of the invention, such as will enable others skilled in the art to which it appertains to make and use the same.

My invention relates to improvements in dish washing and draining apparatus; and its novelty will be fully understood from the following description and claims when taken in connection with the annexed drawings, in which—

Figure 1, is a perspective view of my improved apparatus with the dish receptacle in its elevated position. Fig. 2, is a diametrical section illustrating the dish receptacle within the water pan, and Fig. 3, is a detail, enlarged section illustrating the manner of connecting the guide and pivot post or spindle to the water pan.

In the said drawings, similar letters designate corresponding parts throughout the several views, referring to which—

A, indicates the water pan which is preferably of a circular form and of about the proportional size illustrated, and is provided with handles as A', and B, indicates the guide and pivot post or spindle which rises from the center of the water pan as illustrated. This post or spindle B, is hollow or tubular (see Fig. 3), and it is interiorly threaded at its lower end to engage a threaded stud C, which is connected to or formed integral with a disk or plate D, which in turn is connected to the bottom of the pan A, by bolts, rivets, or the like, as shown.

E, indicates the dish receptacle which is of a form and size to adapt it to take and move within the water pan. This dish receptacle is provided in its bottom with apertures as *a*, for the admission and escape of water, and it is also provided in its side wall with vertical or approximately vertical slots *b*, which are preferably formed by striking out the metal since the struck out portion *e*, serves as a radial flange to deflect the water into the receptacle when the same is rotated as presently described. The dish receptacle E, is furthermore provided with a central socket or sleeve as F, which extends through its bottom and is fixedly connected to a flange, sleeve or collar as G, which in turn, is connected to the bottom of the receptacle by rivets as *d*, in the manner illustrated. The said socket or sleeve F, is designed to receive the post or spindle B, of the water pan, and it is provided at its upper end with a handle as H, whereby it will be seen that the receptacle may be conveniently rotated and moved up and down in the water within the pan A, so as to agitate the same and thereby facilitate the cleansing of the dishes, contained in the receptacle.

In order to support the dish receptacle above the water in the pan A, so as to permit the dishes to drain, I have provided the supports I. These supports are preferably of a loop-form as better shown in Fig. 1, and they are provided at their ends with eyes *e*, which loosely engage the loop handles A', of the water pan. By this manner of connecting the said supports it will be seen that they may be made to assume the position shown in Fig. 1, so as to engage the flange *f*, of the receptacle E, and support the same, or the position shown in Fig. 2, when they may be conveniently grasped with the handles against which they lay.

In the practice of my invention, I prefer to detachably connect the post or spindle B, to the pan A, in the manner described, so as to enable the operator to readily remove the said post, when it is desired to use the pan as a dish-pan, in the usual way, but I do not desire to be understood as confining myself to such manner of connecting the post or spindle B, as it may be detachably connected in any approved manner, or if desired may be fixedly connected to or formed integral with the pan.

From the foregoing description taken in connection with the drawings it will be seen that my improved apparatus is very simple, durable and inexpensive.

Having described my invention, what I claim is—

1. The improved dish washing apparatus described, comprising the pan, having the externally threaded stud rising from the center of the bottom thereof, the hollow post B, internally threaded at its lower end and engaging said stud, the dish receptacle E, having slotted sides carrying flanges, and a perforated bottom with a central hole, the collar G, arranged in said hole, and secured to the dish receptacle, the socket F, having the handle at its upper end, and secured to the dish receptacle at its lower end, and adapted to turn around the hollow post B, whereby said receptacle may be rotated and moved vertically within the pan and the receptacle and hollow post removed from the pan altogether when desired, substantially as specified.

2. The improved dish washing apparatus described, comprising the pan having the externally threaded stud rising from the center of the bottom thereof, the hollow post B, internally threaded at its lower end and engaging said stud, the dish receptacle E, having the perforated bottom and the slotted sides carrying flanges, and the hollow post or socket receiving the post of the pan and having a handle at its upper end, all constructed to operate, substantially as and for the purpose set forth.

In testimony whereof I affix my signature in presence of two witnesses.

FRANCIS HENRY WEST.

Witnesses:
JENNIE LOUISE WEST,
J. E. HEDGES.